(12) United States Patent
Morrow

(10) Patent No.: US 6,624,535 B2
(45) Date of Patent: Sep. 23, 2003

(54) DIGITALLY CONTROLLING THE OUTPUT VOLTAGE OF A PLURALITY OF VOLTAGE SOURCES

(75) Inventor: Michael W. Morrow, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 09/785,920

(22) Filed: Feb. 17, 2001

(65) Prior Publication Data

US 2002/0113493 A1 Aug. 22, 2002

(51) Int. Cl.[7] .................................................. H02J 7/34
(52) U.S. Cl. ............................ 307/71; 307/43; 307/48; 307/85
(58) Field of Search ......................... 307/43, 48, 71, 307/85, 86, 80, 81; 320/117

(56) References Cited

U.S. PATENT DOCUMENTS

| | | | | | |
|---|---|---|---|---|---|
| 4,175,249 A | * | 11/1979 | Gruber | ...................... | 323/15 |
| 4,868,448 A | * | 9/1989 | Kornrumpf | .................. | 310/331 |
| 5,235,232 A | * | 8/1993 | Conley et al. | ............... | 310/303 |
| 5,519,261 A | * | 5/1996 | Stewart | ........................ | 307/87 |
| 5,712,553 A | * | 1/1998 | Hallberg | ....................... | 320/15 |
| 6,205,036 B1 | * | 3/2001 | Anzawa | ....................... | 363/20 |
| 6,268,711 B1 | * | 7/2001 | Bearfield | ..................... | 320/117 |
| 6,286,764 B1 | * | 9/2001 | Garvey et al. | ........... | 236/12.12 |
| 6,459,175 B1 | * | 10/2002 | Potega | ........................ | 307/149 |

* cited by examiner

Primary Examiner—Gregory J. Toatley, Jr.
Assistant Examiner—Robert L DeBeradinis
(74) Attorney, Agent, or Firm—Trop, Pruner & Hu, P.C.

(57) ABSTRACT

A plurality of the voltage sources may be selectively connectable in a variety of different arrangements using a switch array whose connections are determined by a programmable controller. For example, a desired output voltage may be automatically provided by altering the connections between the voltage sources to achieve the desired voltage. A programmable controller may determine how to connect the voltage sources to achieve the desired output voltage.

16 Claims, 3 Drawing Sheets

DIGITALLY CONTROLLING THE OUTPUT VOLTAGE OF A PLURALITY OF VOLTAGE SOURCES

BACKGROUND

This invention relates generally to voltage sources, such as batteries, for any of a variety of applications including operating a processor-based system.

Conventionally, battery powered or portable processor-based systems utilize a battery power source whose output is controlled by a voltage regulator. The voltage source may be made up of a plurality of batteries as one example. Because the equipment being powered, such as a processor-based system, may demand a particular input voltage and because that voltage requirement may vary during operation, typically voltage sources use a regulator to hide the variances of the voltage source due to battery discharge, for example.

Voltage regulators are somewhat inefficient because they dissipate some power in the course of regulating the voltage. Some types of regulators may change their output voltages on the fly, but those types of regulators are inherently linear operating regulators and require extra circuits for a digital control. In addition, regulators may require a relatively long time to change the output voltage. In some cases, switching voltage regulators may emit radio frequency interference (RFI) and so may need some type of RFI shielding.

Thus, there is a need for better ways to control the output voltage of a plurality of voltage sources.

DETAILED DESCRIPTION

Figure 1:
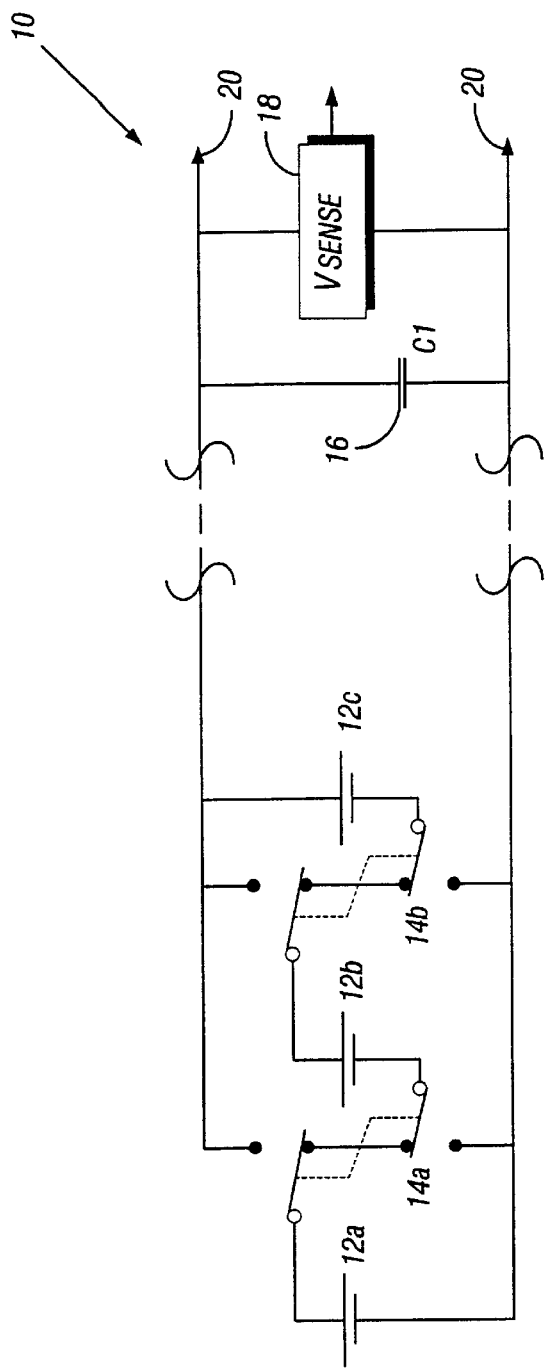
FIG. 1 is a circuit diagram in accordance with one embodiment of the present invention with the voltage sources connected in series.

Referring to FIG. 1, a power supply 10 may include a plurality of voltage sources 12a, 12b and 12c. As indicated by the broken lines in the figure, the number of voltage sources 12 that are included may be highly variable and in some cases many more voltage sources may be included. The voltage sources 12 may be batteries as one example or solar cells as another example. A switch array 14 including switches 14a and 14b may be provided to alter the connections between the various voltage sources 12 to change the voltage across the output terminals 20 of the supply 10. That is, any one of the voltage sources 12 may be disconnected from the output terminals 20, may be connected in series with other voltage sources 12, may be connected in parallel with other sources 12 or may be connected in some combination of series and parallel to develop a desired output voltage.

In one embodiment to the present invention, the switch array 14 includes a double pole double throw (DPDT) switch, operated by a controller, not shown in FIG. 1. In another embodiment, transistor switches, such as field effect transistor switches, may be utilized to control the connections between the voltage sources 12.

Figure 2:
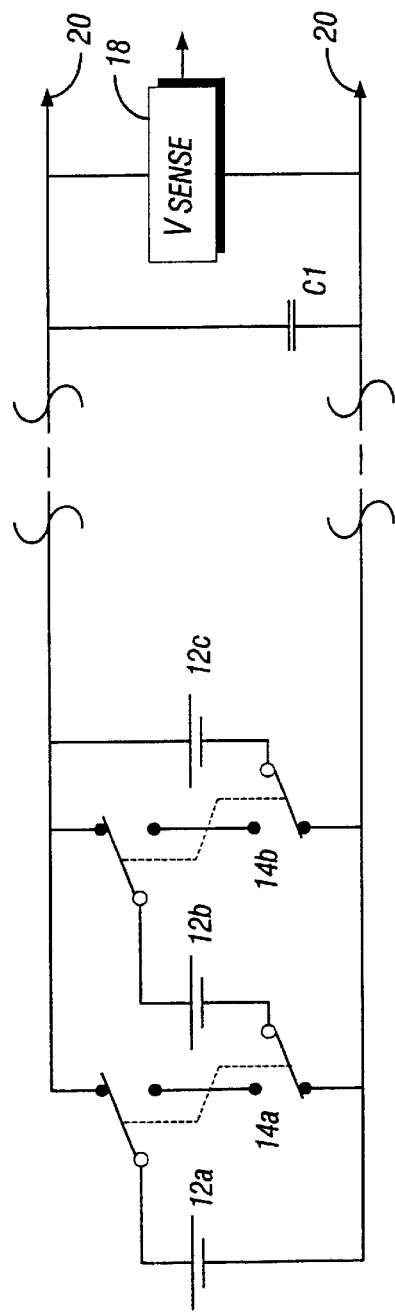
FIG. 2 is a circuit diagram of the embodiment shown in FIG. 1 with the voltage sources connected in parallel.

In general, any switching system may be utilized to form the switch array 14 that enables digital control of the switch state and thereby the manner connecting the voltage sources 12. Thus, in the illustrated embodiment, the switch array 14 may be positioned to connect the voltage sources 12 in series as shown in FIG. 1 or in parallel as shown in FIG. 2. With more voltage sources 12 a wide variety of connections may be possible to greatly increase the number of possible output voltages that may be supplied. The number of possible output voltages may also be increased by using voltage sources of a variety of different output voltages.

A parallel-connected capacitor 16 may be provided to smooth any switching transients. In addition, a voltage sensor 18 may be provided to detect the actual output voltage across the output terminals 20. The sensor 18 may provide feedback to determine whether the connections set by the switch array 14 were effective in providing the desired output voltage. In some cases, the voltage sources 12 may not produce their nominal voltages. Instead, their nominal voltages may diminish over time and as a result, the resulting output voltage may be different than what would be expected. In addition, the voltage sensor 18 may be utilized to check the voltages of one or more of the voltage sources 12 in some embodiments.

Figure 3:
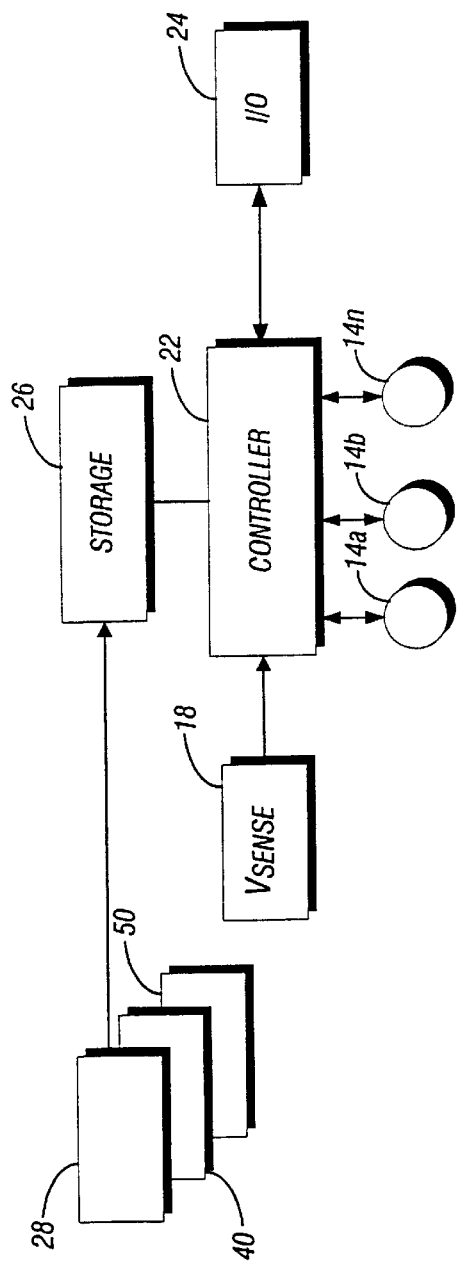
FIG. 3 is a block depiction of a controller for controlling the output voltage of a plurality of voltage sources.

Turning next to FIG. 3, a controller 22 may be connected to each of the switches 14a, 14b and 14n making up the switch array 14. The number of switches may be highly variable as it may include any number of switches 14a to 14n. In addition, the controller 22, which may be a processor-based device, may be coupled to receive the voltage sensor 18 output signal. The controller 22 may include its own storage 26 that stores software routines 28 and 40. In addition, the controller 22 may provide output signals and receive input signals from an input/output device 24. For example, user inputs may be provided to the controller 22. As one example, when a voltage source 12 needs to be replaced the user can so indicate to the controller 22. In response, the controller 22 may place the voltage sources 12 in parallel so that one of those voltage sources 12 may be replaced without losing device state.

Figure 4:
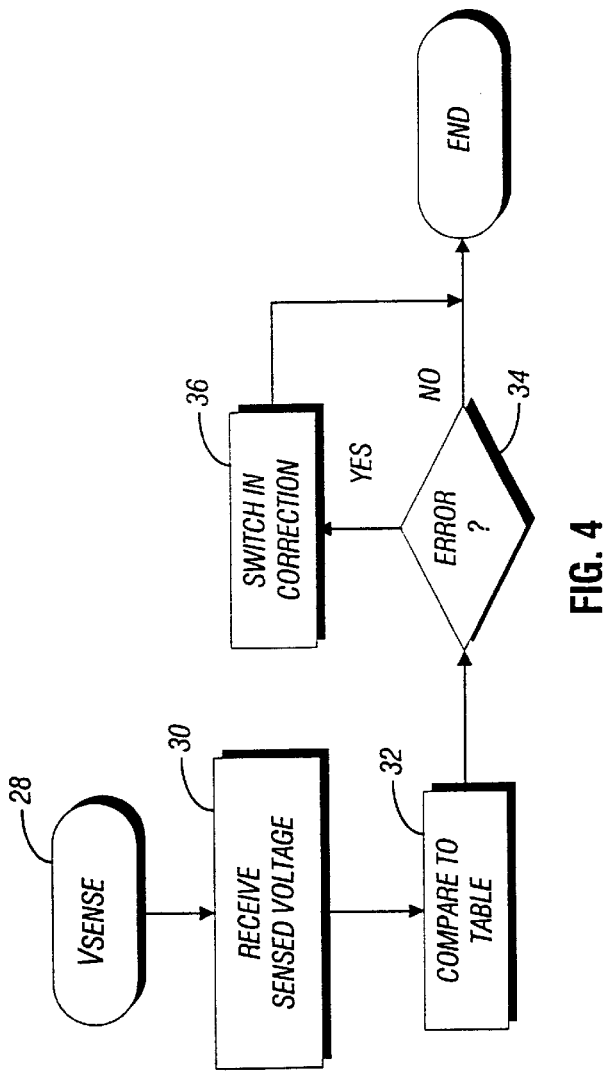
FIG. 4 is a flow chart for software that may be utilized with the controller shown in FIG. 3 in accordance with one embodiment of the present invention.

Referring to FIG. 4, the software 28 may be utilized to monitor the output voltage of the supply 10. Initially, the controller 22 receives a sensed voltage across the output terminals 20 from the voltage sensor 18 as indicated in block 30. This output voltage is then compared to a table of voltages that would be expected with the connection between the voltage sources 12 that was implemented, as indicated in block 32. If an error exists, as determined in diamond 34, an additional voltage source 12 may be switched in, either in place of an existing voltage source 12 or as an adjunct to one or more existing voltage sources 12 or a change in the switch array 14 may be provided in order to create the desired voltage output. In some cases, auxiliary voltage sources 12 may be provided, that are connectable through switch array 14 to the rest of the supply 10, on an as needed basis.

Figure 5:
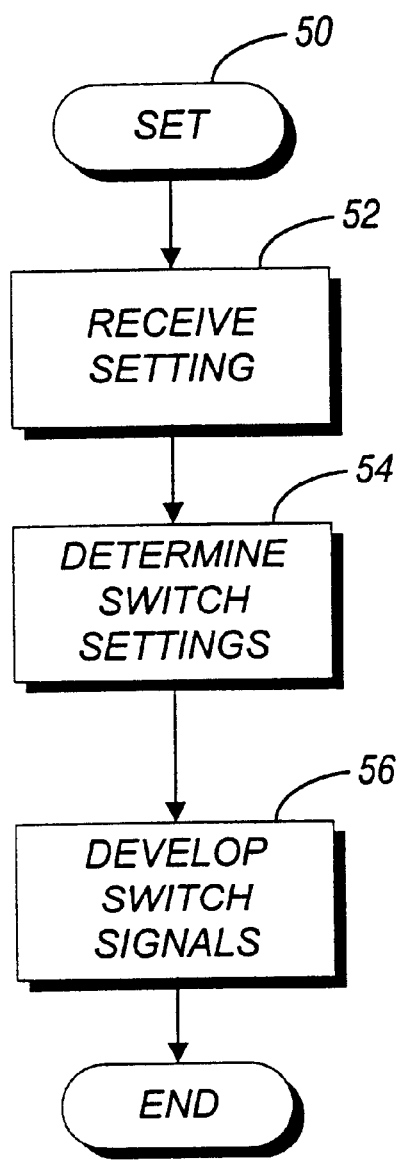
FIG. 5 is a flow chart for software that may be utilized with the controller shown in FIG. 3 in accordance with one embodiment of the present invention.

Generally, the user may provide an input signal through the input/output terminals 24 to the controller 22 indicating a desired output voltage as indicated in FIG. 5. After receiving a user specified voltage as (indicated in block 52), the software 50 may cause the controller 22 to use a look-up table or may calculate the connections for the various voltage sources 12 needed to supply the desired output voltage as indicated in block 54. The controller 22 then develops output signals that control the connections of the switch array 14 to create the desired output voltage across the terminals 20 as indicated in block 56. Of course, each voltage change may be very quickly implemented since the controller 22 may rapidly cause the switch array 14 to changed its connections.

Figure 6:
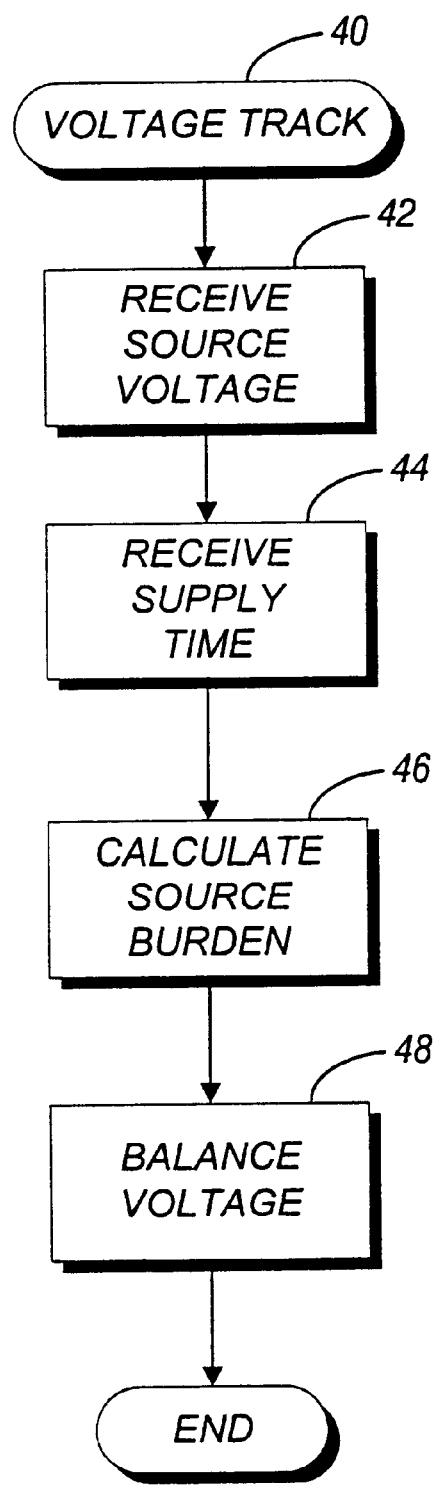
FIG. 6 is a flow chart for software that may be utilized with the controller shown in FIG. 3 in accordance with one embodiment of the present invention.

Referring to FIG. 6, voltage tracking software 40 may be used to monitor the output voltages produced by each of the voltage sources 12. Initially, the software 40 receives source 12 voltage information as indicated in block 42. The source 12 voltage information provides information about how much voltage was supplied at any given time by an individual voltage source 12. This may be achieved by actually sensing the output voltage using the sensor 18 or by calculation knowing the desired output voltage and thereby determining the contribution from any one voltage source 12 to that output voltage.

In addition, software 40 receives information about the amount of time that a particular voltage source 12 supplied a given voltage as indicated in block 44. With the output voltage level and supply time, the software 40 calculates the burden on each source 12 as indicated in block 46. The output burden is accumulated output burden that includes the current service performance as well as past history. Based on the load on any one voltage source, the use of the voltage source 12 in the future may be balanced. That is, if one voltage source 12 is being used to an excessive degree, in the future the supply 10 may automatically preferentially use other voltage sources 12 in place of an overused voltage source 12. This in turn may result in an extension of the life of the various voltage sources 12 in some embodiments.

While an embodiment is illustrated in which the voltage setting, compensation and drain balance are accomplished by using software, hardware techniques may be utilized as well.

The present invention may be utilized with a variety of devices that use a range of voltages such as radio subsystems for variable power transmission, displays for variable brightness, and processors for variable performance, to mention a few examples.

In accordance with some embodiments of the present invention, the regulation inefficiency of conventional voltage regulators may be avoided or reduced, resulting in longer voltage source life and potentially fewer voltage sources. In some embodiments, digital control may be provided over the voltage sources, facilitating digital or on the fly voltage changes. Moreover, these changes may be implemented relatively quickly compared to systems using voltage regulators, especially when the switch array 14 uses transistor switches. In addition, in some cases, radio frequency interference (and the need to shield against such interference) may be avoided.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

providing a switch array;

providing a plurality of voltage sources connectable in a plurality of ways through said switch array;

programmably controlling the connections between said voltage sources to develop a desired output voltage;

receiving a user specified output voltage; and automatically providing the user specified output voltage.

2. The method of claim 1 including determining the output voltage and using said determined output voltage to check the output voltages developed by said voltage sources.

3. The method of claim 1 including receiving information about the actual output voltage, determining whether the actual output voltage corresponds to a desired output voltage and automatically changing the connections between the voltage sources to cause the actual output voltage to be closer to the desired output voltage.

4. The method of claim 1 including automatically correcting the output voltage if an incorrect output voltage is produced.

5. The method of claim 1 including automatically balancing the load among the voltage sources.

6. The method of claim 1 including receiving information about the voltage supplied by each voltage source, determining the amount of time that each source has supplied that particular voltage, calculating a burden on each source, and in response to the calculated burden, balancing the usage of the voltage sources.

7. An article comprising a medium storing instructions that, if executed, enable a processor-based system to:

receive a request for an output voltage from a user; and programmably control the connections between a plurality of voltage sources to develop the requested output voltage by adjusting the connections between a plurality of voltage sources.

8. The article of claim 7 further storing instructions that enable the processor-based system to determine the output voltage generated and use the generated output voltage to check the output voltages developed by each of the plurality of voltage sources.

9. The article of claim 7 further storing instructions enable the processor-based system to receive information about an actual output voltage, determine whether the actual output voltage corresponds to a desired output voltage, and automatically change the connections between voltage sources to cause the actual output voltage to be closer to the desired output voltage.

10. The article of claim 7 further storing instructions that enable a processor-based system to automatically correct the output voltage upon detection of an incorrect output voltage.

11. The article claim 7 further storing instructions that enable a processor-based system to automatically balance the load among the plurality of voltage sources.

12. The article of claim 7 further storing instructions that enable the processor-based system to receive information about the voltage supplied by each of the plurality of voltage sources, determine the amount of time that each voltage source has supplied a particular voltage, calculate a burden on each voltage source, and in response to the calculated burden, balance the usage of the voltage sources.

13. A voltage supply comprising:

a plurality of voltage sources;

a switch array to selectively connect the sources in a plurality of different ways to alter the voltage supplied by the supply;

a controller to programmably control the switch array; and an input device to receive user specified output voltage levels, said controller to automatically provide the desired output voltage in response to a user input of a desired output voltage.

14. The supply of claim 13 including a storage, said controller coupled to said storage, said storage storing instructions that enable the controller to receive information about the voltage supplied by at least two different sources, determine the amount of time that each of the two sources is supplied as particular voltage, calculate a burden on each of the two sources, and in response to the calculated burden, balance the usage among the two voltage sources.

15. An article comprising a medium storing instructions that, if executed, enable a processor-based system to:

receive a request for an output voltage;

programmably control the connections between at least two voltage sources to develop the requested output voltage;

receive information about the voltage supplied by each of the two voltage sources;

determine the amount of time that each voltage source has supplied a particular voltage;

calculate a burden on each voltage source; and in response to the calculated burden, balance the usage of the two voltage sources.

16. The article of claim 13 further storing instructions that, if executed, enable the processor-based system to automatically provide a user specified output voltage by adjusting the connections between a plurality of voltage sources.

* * * * *

UNITED STATES PATENT AND TRADEMARK OFFICE
CERTIFICATE OF CORRECTION

PATENT NO.    : 6,624,535 B2
DATED         : September 23, 2003
INVENTOR(S)   : Michael W. Morrow It is certified that error appears in the above-identified patent and that said Letters Patent is hereby corrected as shown below:

<u>Column 6,</u>
Line 8, "13" should be -- 15 --.

Signed and Sealed this

Sixth Day of January, 2004

JAMES E. ROGAN
*Director of the United States Patent and Trademark Office*